United States Patent [19]

Lüders et al.

[11] 4,307,009

[45] Dec. 22, 1981

[54] FILLER-CONTAINING MOLDING COMPOSITION AND PROCESS FOR ITS MANUFACTURE

[75] Inventors: Walter Lüders, Neu-Isenburg; Karlheinz Burg, Wiesbaden; Walter Herwig, Bad Soden; Ulrich van Spankeren, Hofheim, all of Fed. Rep. of Germany

[73] Assignee: Hoechst Aktiengesellschaft, Frankfurt am Main, Fed. Rep. of Germany

[21] Appl. No.: 130,217

[22] Filed: Mar. 14, 1980

[30] Foreign Application Priority Data

Mar. 17, 1979 [DE] Fed. Rep. of Germany ....... 2910586

[51] Int. Cl.$^3$ .............................................. C08K 9/00
[52] U.S. Cl. ................................ 260/42.14; 260/42.46
[58] Field of Search ........................... 260/42.14, 42.46

[56] References Cited

U.S. PATENT DOCUMENTS

| | | | |
|---|---|---|---|
| 3,471,439 | 10/1969 | Bixler et al. | 260/42.14 |
| 3,884,871 | 5/1975 | Herman et al. | 260/42.14 |
| 4,151,136 | 4/1979 | Cornell | 260/42.14 |

*Primary Examiner*—Lewis T. Jacobs
*Attorney, Agent, or Firm*—Curtis, Morris & Safford

[57] ABSTRACT

In filler-containing molding compositions a very good compatibility between the hydrophilic filler and the hydrophobic polymer matrix is obtained by using as adhesion promotor alkali metal salts of alkyl or alkylene-sulfonic acids or alkyl sulfates, the derivatives thereof and the acids on which the salts are based. The flow properties of the molding compositions and the mechanical properties of the shaped articles made therefrom are improved.

6 Claims, No Drawings

FILLER-CONTAINING MOLDING COMPOSITION AND PROCESS FOR ITS MANUFACTURE

It is known that mechanical, electrical and thermal properties of plastic materials can be improved by the addition of inorganic filling materials. Due to the hydrophilic properties of these fillers, they are only slightly compatible with the mostly hydrophobic polymers. Therefore, some of the mechanical properties of polymers filled with inorganic substances are detrimentally affected.

It is known to treat natural or synthetic calcium carbonates with surface-active substances to improve their dispersibility in plastic materials. Substances of this type include saturated and unsaturated fatty acids having a medium or high molecular weight, for example butyric acid, lauric acid, oleic acid, stearic acid (cf. DE-PS No. 958,830).

It has also been proposed to use calcium carbonate treated with stearic acid as a component imparting impact resistance in the manufacture of impact resistant, plasticizer-free shaped articles on the basis of polyvinyl chloride (cf. DE-AS No. 1,469,886).

It is also known to combine calcium carbonate with compounds containing an ethylene bond in the molecule and with free radical initiators (cf. DE-OS No. 1,794,310 and DE-OS No. 2,061,180.

According to another known process alkaline earth metal carbonates are reacted with at least one unsaturated carboxylic acid in the pulverulent inorganic material while stirring and in the absence of liquid water. In this process free radical forming substances may be present (cf. DE-AS No. 2,262,126).

It has been found, however, that the improvement of the mechanical properties, especially of polyolefins, obtainable with the use of modified alkaline earth metal carbonates is not sufficient.

According to another proposal organo-phosphorus compounds, especially phosphonic acids and the esters thereof, are used as adhesion promotors between the alkaline earth metal carbonate and the polyolefin (cf. DE-OS No. 2,735,160). It has been found, however, that the extrusion rate cannot be satisfactorily improved with the specified compounds.

It has now been found that a very good compatibility between the hydrophilic filler and the hydrophobic polymer matrix can be obtained and the mechanical properties of shaped articles made from such compositions can be improved by using as adhesion promotor definite organic sulfur compounds. In this manner flow properties of the molding compositions are likewise improved considerably.

It is, therefore, the object of the present invention to provide a filler-containing molding composition consisting of 90 to 20 parts by weight of a polyolefin, 10 to 80 parts by weight of an alkaline earth metal carbonate, the usual additives and 0.1 to 10% by weight, calculated on the filler, of an adhesion promotor, wherein the adhesion promotor is an organic sulfur compound of the formula

$$R-SO_3-Me \qquad (I)$$

in which R denotes a linear or branched alkyl or alkenyl radical having from 6 to 22 carbon atoms which may be substituted by a hydroxy or acetoxy group, the radical $R^1-O(CH_2CH_2O)_m$ in which $R^1$ is alkyl having from 6 to 22 carbon atoms and m is an integer from 1 to 4, the radical $R^1-CO-O(CH_2)_n$ in which $R^1$ is as defined above and n is an integer from 2 to 4, or the radical $R^1-CO-NH(CH_2)_n$ in which $R^1$ and n are as defined above and Me is hydrogen or an alkali metal.

The organic sulfur compounds of the formula I to be used according to the invention are alkali metal salts of alkyl- or alkenylsulfonic acids and of alkyl sulfates and their derivatives and the acids on which the salts are based.

In the formula I R denotes a linear or branched alkyl or alkenyl radical having from 6 to 22 and preferably from 10 to 17 carbon atoms, which may be substituted by a hydroxy or acetoxy group, R likewise denotes the radical of the formula $R^1-O(CH_2CH_2O)_m$ in which $R^1$ denotes an alkyl radical having from 6 to 22 and preferably from 10 to 14 carbon atoms and m is an integer from 1 to 4. The diethylene glycol ether radical is preferred, i.e. a radical with m being 2. R can also stand for the radical of the formula $R^1-CO-O(CH_2)_n$ in which $R^1$ is as defined above and n is an integer from 2 to 6 and preferably 2. Finally, R can also represent the radical $R^1-CO-NH(CH_2)_n$ in which $R^1$ and n are as defined above. Me denotes an alkali metal, preferably sodium, or hydrogen.

The alkyl or alkenyl-sulfonic acids or alkyl sulfates and their derivatives to be used according to the invention can be prepared by known methods.

The alkyl sulfonic acids can be prepared, for example, by sulfoxidation of aliphatic hydrocarbons, by reaction of alkyl halides with sulfites or by saponification of alkyl sulfochlorides obtainable by sulfochlorination of hydrocarbons (cf. Houben-Weyl, Methoden der Organischen Chemie, volume IX, Thieme Verlag, Stuttgart 1955).

The acids from which the alkali metal alkyl sulfates derive can be prepared, for example, by reaction of the corresponding alcohols with sulfur trioxide.

In the case of R in formula I being an acyloxy or acylaminoalkylene radical, the acids on which the alkali metal alkyl sulfonates are based can be prepared in known manner by condensation of carboxylic acids with oxalkylene sulfonic acids or aminoalkylene sulfonic acids.

Suitable sulfonic acids are, for example hexene-1-sulfonic acid, heptane-1-sulfonic acid, octane-1-sulfonic acid, octane-2-sulfonic acid, nonane-1-sulfonic acid, nonane-5-sulfonic acid, decane-1-sulfonic acid, undecane-1-sulfonic acid, dodecane-1-sulfonic acid, dodecane-4-sulfonic acid, tetradecane-1-sulfonic acid, hexadecane-1-sulfonic acid, octadecane-1-sulfonic acid, docosane-1-sulfonic acid, 2,4,4-trimethyl-pent-1-ene-1-sulfonic acid, hexadec-2-ene-1-sulfonic acid, 2-hydroxy-dodecane-1-sulfonic acid, 2-hydroxy-tetradecane-1-sulfonic acid, 2-hydroxy-hexadecane-1-sulfonic acid, 2-acetoxy-dodecane-1-sulfonic acid, 2-acetoxy-tetradecane-1-sulfonic acid, 2-(octanoyloxy)-ethane-1-sulfonic acid, 2-(undecanoyloxy)-ethane-1-sulfonic acid, 2-(dodecanoyloxy)-ethane-1-sulfonic acid, 2-(tetradecanoyloxy)-ethane-1-sulfonic acid, 2-(heptadecanoyloxy)-ethane-1-sulfonic acid, 2-(oleoyloxy)-ethane-1-sulfonic acid, 2-(undecanoylamino)-ethane-1-sulfonic acid, 2-(dodecanoyl-amino)-ethane-1-sulfonic acid, 2-tetradecanoylamino)-ethane-1-sulfonic acid, 2-(heptadecanoylamino)-ethane-1-sulfonic acid, 2-heptadecanoyl-2-methylamino)-ethane-1-sulfonic acid, 2-(octadecanoyl-2-methylamino)-ethane-1-sulfonic acid, 2-(oleoylamino)-ethane-1-sulfonic acid and sulfonic acids with different carbon chain lengths readily obtainable by sulfoxidation of aliphatic hydrocarbon mixtures, as well as the sodium and potassium salts thereof.

Preference is given to sodium hexadec-2-ene-1-sulfonate, sodium 2-hydroxy-dodecane-1-sulfonate, sodium 2-hydroxy-tetradecane-1-sulfonate, sodium 2-hydroxy-hexadecane-1-sulfonate, 2-acetoxy-dodecane-1-sulfonate, sodium 2-acetoxy-tetradecane-1-sulfonate, sodium 2-(oleyloxy)-ethane-1-sulfonate, 2-(undecanoyloxy)-ethane-1-sulfonate, sodium (heptadecanoyloxy)-ethane-1-sulfonate, 2-(tetradecanoylamino)-ethane-1-sulfonate and secondary sodium $C_{13}$–$C_{18}$-alkane-sulfonates.

Suitable sulfuric acid esters are, for example: Sulfuric acid-mono-(2-dodecyl ether)-ethylene glycol ester, sulfuric acid-mono-(octyl ether)diethylene glycol ester, sulfuric acid-mono-(hexadecyl ether)-ethylene glycol ester, sulfuric acid-mono-(dodecyl ether)-diethylene glycol ester, sulfuric acid-mono-(tetradecyl ether)-diethylene glycol ester, sulfuric acid-mono-(hexadecyl ether)-diethylene glycol ester, sulfuric acid-mono-(octadecyl ether)-diethylene glycol ester, sulfuric acid-mono-(dodecyl ether)-triethylene glycol ester, sulfuric acid-mono-(hexadecyl ether)-triethylene glycol ester and sulfuric acid-mono-(dodecyl ether)-tetraethylene glycol ester and the potassium and sodium salts thereof.

Preference is given to the sodium salt of sulfuric acid mono(dodecyl ether)-diethylene glycol ester and the sodium salt of sulfuric acid-mono-(dodecyl ether)-triethylene glycol ester.

The sulfonic acids, sulfonates and sulfuric acid esters and sulfates to be used according to the invention are added to the molding composition in an amount of from 0.1 to 10% by weight, preferably 0.5 to 2% by weight, calculated on the filler. It is likewise possible, of course, to use mixtures of different sulfonates with sulfates.

Natural or synthetic, i.e. precipitated, alkaline earth metal carbonate can be used as fillers, for example, ground limestone, chalk, precipitated calcium carbonate, natural magnesite, natural hydromagnesite, synthetic basic magnesium carbonate, calcium-magnesium carbonate, dolomite. Calcium carbonates are preferred. The alkaline earth metal carbonates to be used according to the invention have an average particle diameter of from 0.1 to 50 µm, preferably 1 to 10 µm. Mixtures of different alkaline earth metal carbonates can also be used.

The adhesion promotors can be incorporated into the molding composition in various ways.

The filler can be suspended in an organic solvent and the adhesion promotor can be added directly or in the form of a solution in a suitable solvent; whereupon the mixture is thoroughly stirred at room temperature or at elevated temperature, the solvent is distilled off and the residue is dried. Alternatively, the filler can be mixed with the adhesion promotor in a mixer at room temperature or at elevated temperature, optionally above the melting point of the adhesion promotor.

When the adhesion promotor is liquid it can be added dropwise to the filler in a rapid mixer either directly or diluted with a suitable solvent or it can be sprayed onto the filler by a suitable spraying device in the form of a mist. In this manner it is also possible to apply to the filler a solution of a solid adhesion promotor.

According to another mode of operation the adhesion promotor is mixed with the polymer in a mixer whereupon the untreated filler is added, or all three components, i.e. the polymer, the filler and the adhesion promotor are mixed simultaneously. Mixing can take place in a preliminary mixer or in the granulation extruder.

It is preferred first to treat the filler with the adhesion promotor.

The filler is added to the polymer in an amount of from 10 to 80% by weight, preferably 30 to 70% by weight.

The molding compositions according to the invention contain as basic polymer 1-olefin homo- and copolymers, for example polyethylene of high and low density, polypropylene, polybutene-1, poly(4-methyl)-pentene-1, olefin copolymers such as ethylene-propylene copolymers and ethylene-butene copolymers, mixtures of the aforesaid polymers and mixtures of the polymers with rubber-like polymers. Polyethylene is particularly preferred.

The molding compositions contain from 90 to 20 and preferably from 70 to 30% by weight of polymer.

The molding compositions of the invention may contain the common additives which facilitate the further processing and improve the physical properties. There are mentioned light and heat stabilizers, antioxidants, antistatic agents, etc. as well as coloring pigments and flameproofing agents. The former group is generally contained in the molding compositions in an amount of from 0.01 to 5% by weight, calculated on the amount of polymer and filler. Coloring pigments and flameproofing agents are used in an amount which corresponds to the requirements.

An effective stabilizer combination for poly-1-olefins, such as high, medium and low pressure polymers of $C_2$ to $C_4$-1-olefins, especially polyethylene and polypropylene, or for copolymers of such 1-olefins may, for example, consist—each calculated on 100 parts by weight of polymer—of from 0.05 to 4 parts by weight of a phenolic stabilizer, optionally from 0.01 to 4 parts by weight of a sulfur-containing co-stabilizer, and optionally from 0.01 to 3 parts by weight of a basic or neutral metal soap, for example calcium stearate or zinc stearate, as well as optionally from 0.1 to 4 parts by weight of a phosphite, and optionally from 0.01 to 4 parts by weight of a known UV-stabilizer from the group of alkoxyhydroxy-benzophenones, hydroxyphenyl-benzotriazoles, benzylidene-malonic acid-mononitrile esters or the so-called quenchers (for example nickel chelates).

Shaped articles which have been manufactured from the thermoplastic molding composition of the invention show a very good impact strength and tensile impact strength, which makes them especially suitable for the production of technical articles.

An essential advantage of the adhesion promotors to be used according to the invention resides in the fact that they improve the charging of the powder mixture into the extruder and have a favorable influence on the flow properties of the polymer melt, resulting in a higher throughput in the homogenization process in the extruder and facilitating the manufacture of complicated articles by injection molding.

The following examples illustrate the invention.

EXAMPLE 1

500 parts of calcium carbonate having an average particle diameter of 2.5 µm and a specific surface (according to BET) of 2 m²/g are suspended in 2,000 parts of ethanol.

7.5 parts of sodium hexadec-2-ene-1 sulfonate are added while thoroughly stirring, stirring of the suspension is continued for 3 hours at room temperature, whereupon the ethanol is distilled off under reduced pressure and the residue is dried at 40° C. in a vacuum drier.

450 parts of the calcium carbonate thus treated are thoroughly mixed with 1,050 parts of polyethylene (density 0.96 g/cm$^3$, melt index 23 g/10 min., containing 0.42% by weight of a phenolic stabilizer and 2.5% by weight of a sulfur-containing co-stabilizer) in a plowshare mixer.

The mixture obtained is extruded to a strand in a double screw extruder, which strand is then granulated in a cutting machine. By means of an injection molding machine, test specimens are prepared from the granules.

In a comparison example, 450 parts of untreated calcium carbonate are mixed in the same manner with 1,050 parts of polyethylene. The mixture is further processed as described above.

The properties of the test specimens are indicated in Table I, ½ standard rod serving as test specimen.

The elongation and tensile strength are determined according to DIN 53 455, the impact strength according to DIN 53 453 (jaw distance 30 mm, transverse position), the tensile impact strength according to DIN 53 448.

TABLE I

| adhesion promotor | elongation % | tensile strength N/mm$^2$ | impact strength mJ/mm$^2$ | tensile impact strength mJ/mm$^2$ |
|---|---|---|---|---|
| sodium | 20 | 23 | 40 | 80 |
| hexa-dec-2-ene-1-sulfonate | 26 | 22 | 105 | 95 |

EXAMPLES 2 to 4

500 parts of calcium carbonate as used in Example 1 are mixed in a rapid mixer with 7.5 of adhesion promotor at 1,200 rpm for 20 minutes at room temperature.

450 parts of the calcium carbonate treated in this manner are mixed with 1,050 parts of the polyethylene as used in Example 1 and the mixture is processed according to the directions given in Example 1.

The properties of the test specimens are indicated in Table II

TABLE II

| adhesion promotor | elongation % | tensile strength N/mm$^2$ | impact strength mJ/mm$^2$ | tensile impact strength mJ/mm$^2$ |
|---|---|---|---|---|
| $C_{10-16}H_{21-33}$—COO—$CH_2$—$CH_2$—$SO_3Na$ | 22 | 22 | without break | 95 |
| Na-2-(oleoyloxy)-ethane-1-sulfonate | 20 | 22 | without break | 95 |
| sec. Na-n-alkane-sulfonate[1] | 22 | 23 | without break | 95 |

[1]chain distribution: 3% $C_{13}$, 25% $C_{14}$, 30% $C_{15}$, 25% $C_{16}$, 15% $C_{17}$, 2% $C_{18}$

EXAMPLES 5 to 12

In a rapid mixer 500 parts of calcium carbonate of the calcite type having an average particle diameter of 1.5 μm and a specific surface (according to BET) of 7 m$^2$/g are mixed with 7.5 parts of different adhesion promotors at 1,200 rpm for 20 minutes at room temperature.

In a plowshare mixer 450 parts of calcium carbonate treated in the aforesaid manner are thoroughly mixed with 1,050 parts of polyethylene (density 0.96 g/cc, melt index 23 g/min). The mixture is further processed as described in Example 1. The properties of the test specimens are indicated in Table III.

EXAMPLE 13

In a rapid mixer rotating at 1,200 rpm a solution of 4.5 parts of secondary sodium n-alkane-sulfonate (chain distribution 3% $C_{13}$, 25% $C_{14}$, 30% $C_{15}$, 25% $C_{16}$, 15% $C_{17}$, 2% $C_{18}$) in 18 parts of water is sprayed within 45 minutes by means of an atomizer on 500 parts of calcium carbonate of the calcite type having an average particle diameter of 1.5 μm and a specific surface (according to BET) of 7 m$^2$/g.

In a plowshare mixer 450 parts of the calcium carbonate treated as described above are thoroughly mixed with 1,050 parts of polyethylene (density 0.96 g/cc, melt index 23 g/10 min, containing 0.42 by weight of a phenolic stabilizer and 2.5% by weight of a sulfur-containing co-stabilizer). The mixture is further processed as described in Example 1. The properties of the test specimens are indicated in Table III.

EXAMPLE 14

Example 13 is repeated with the exception that, instead of the secondary sodium n-alkane-sulfonate, a solution of 5 parts of the sodium salt of sulfuric acid mono-(dodecyl ether)-diethylene glycol ester in 40 parts of water is used. The mixture is further processed as described in Example 1. The properties of the test specimens are indicated in Table III

TABLE III

| Example | adhesion promotor | elongation % | tensile strength N/mm$^2$ | impact strength mJ/mm$^2$ | tensile impact strength mJ/mm$^2$ |
|---|---|---|---|---|---|
| comp. | — | 21 | 27 | 47 | 80 |
| 5 | $C_{10-16}H_{21-33}COO$—$(CH_2)_2$—$SO_3Na$ | 34 | 23 | without break | 90 |
| 6 | $C_{14}H_{29}CH(OH)$—$CH_2SO_3Na$ | 28 | 23 | 80 | 95 |
| 7 | $C_{13}H_{27}CH{=}CH$—$CH_2$—$SO_3Na$ | 30 | 22 | 80 | 95 |
| 8 | sec. Na-n-alkane-sulfonate | 32 | 22 | without break | 85 |
| 9 | $C_{12}H_{25}CH{=}CH$—$CH_2$—$SO_3K$ | 26 | 23 | 100 | 90 |
| 10 | $C_{14}H_{29}CH(OCOCH_3)$—$CH_2$—$SO_3Na$ | 30 | 22 | 80 | 90 |
| 11 | $C_{10-16}H_{21-33}CONH(CH_2)_2$—$SO_3Na$ | 28 | 22 | 70 | 85 |
| 12 | Na-2(oleoylamino)- | 32 | 21 | without | 90 |

TABLE III-continued

| Example | adhesion promotor | elongation % | tensile strength N/mm$^2$ | impact strength mJ/mm$^2$ | tensile impact strength mJ/mm$^2$ |
|---|---|---|---|---|---|
| 13 | ethane-1-sulfonate sec. Na-n-alkanesulfonate | 30 | 23 | break without break | 85 |
| 14 | $C_{12}H_{25}$—O($CH_2$—$CH_2$—$\neq$O)$_2$—SO$_3$Na | 32 | 23 | 100 | 85 |

EXAMPLES 15 to 17

600 parts of calcium carbonate having an average particle diameter of 2.5 μm and a specific surface (according to BET) of 2 m$^2$/ are mixed in a rapid mixer with different amounts of a secondary sodium n-alkanesulfonate (chain distribution 3% $C_{13}$, 25% $C_{14}$, 30% $C_{15}$, 25% $C_{16}$, 15% $C_{17}$, 2% $C_{18}$) at 800 rpm for 30 minutes at room temperature.

The calcium carbonate treated in this manner is thoroughly mixed in a plowshare mixer with 900 parts of polyethylene as specified in Example 1. The mixture is further processed as described in Example 1. In a comparative example untreated calcium carbonate is mixed with polyethylene in a proportion of 6:9 and the mixture is further processed as described above. The properties of the test specimens are indicated in Table IV.

TABLE IV

| Example | adhesion promotor[1] % | elongation % | tensile strength N/mm$^2$ | impact strength mJ/mm$^2$ | tensile impact strength mJ/mm$^2$ |
|---|---|---|---|---|---|
| Comp. | — | 14 | 21 | 13 | 70 |
| 15 | 0.5 | 19 | 21 | 64 | 75 |
| 16 | 1.0 | 19 | 21 | 88 | 80 |
| 17 | 2.0 | 18 | 22 | 85 | 75 |

[1] calculated on filler amount

EXAMPLES 18 to 20

Example 16 is repeated with the exception that instead of the secondary sodium n-alkane-sulfonate, other adhesion promotors are used. The properties of the test specimens are indicated in Table V.

TABLE V

| Example | adhesion promotor | elongation % | tensile strength N/mm$^2$ | impact strength mJ/mm$^2$ | tensile impact strength mJ/mm$^2$ |
|---|---|---|---|---|---|
| 18 | $C_{13}H_{27}CH=CH$—$CH_2$—$SO_3Na$ | 15 | 21 | 42 | 75 |
| 19 | $C_{12}H_{25}$—O($CH_2$—$CH_2$—O)$_2$—$SO_3Na$ | 13 | 21 | 39 | 75 |
| 20 | sodium 2-(oleoyloxy)-ethane-1-sulfonate | 16 | 20 | 41 | 75 |

EXAMPLE 21

750 parts of calcium carbonate having an average particle diameter of 2.5 μm and a specific surface (according to BET) of 2 m$^2$/g are mixed in a rapid mixer with 11 parts of a sulfonate of the formula $C_{10\text{-}16}H_{21\text{-}33}COOCH_2$—$CH_2$—$SO_3Na$ at 1,200 rpm for 20 minutes at room temperature.

In a plowshare mixer the calcium carbonate treated as described above is thoroughly mixed with 750 parts of polyethylene as specified in Example 1, whereupon the mixture is further processed as described in Example 1. In a comparative example untreated calcium carbonate is mixed with polyethylene in a proportion of 1:1 and the mixture is further processed as described above.

The properties of the test specimens are indicated in Table VI.

EXAMPLE 22

Example 21 is repeated using as adhesion promotor the secondary sodium n-alkane-sulfonate specified in Examples 15 to 17. The properties of the test specimens are indicated in Table VI.

TABLE VI

| Example | elongation % | tensile strength N/mm$^2$ | impact strength mJ/mm$^2$ | tensile impact strength mJ/mm$^2$ |
|---|---|---|---|---|
| comp. | 4 | 25 | 8 | 55 |
| 21 | 10 | 20 | 22 | 60 |
| 22 | 9 | 19 | 31 | 65 |

EXAMPLE 23

750 parts of calcium carbonate of the calcite type having an average particle diameter of 5 μm and a specific surface (according to BET) of 1 m$^2$/g are mixed in a rapid mixer at 1,200 rpm for 20 minutes at room temperature with 7.5 parts of sodium 2-(oleoyloxy)-ethane-1-sulfonate.

The calcium carbonate treated in this matter is thoroughly mixed in a plowshare mixer with 750 parts of polyethylene as specified in Example 1.

In a comparative example the untreated calcium carbonate is mixed with the polyethylene in a proportion of 1:1.

The properties of the test specimens are indicated in Table VII.

EXAMPLE 24

Example 23 is repeated but with the secondary n-alkane-sulfonate as used in Examples 15 to 17 as adhesion promotor. The properties of the test specimens are indicated in Table VII.

TABLE VII

| Example | elongation % | tensile strength N/mm$^2$ | impact strength mJ/mm$^2$ | tensile impact strength mJ/mm$^2$ |
|---|---|---|---|---|
| comp. | 10 | 20 | 7 | 70 |
| 23 | 12 | 18 | 36 | 75 |
| 24 | 15 | 17 | 77 | 75 |

EXAMPLES 25 to 28

900 parts of calcium carbonate having an average particle diameter of 2.5 μm and a specific surface (according to BET) of 2 m²/g are mixed in a rapid mixer at 1,200 rpm for 20 minutes at room temperature with 13.5 parts of different adhesion promotors.

The calcium carbonate treated in this manner is thoroughly mixed in a plowshare mixer with 600 parts of polyethylene as specified in Example 1. Further processing is the same as in Example 1.

In a comparative example untreated calcium carbonate is mixed with the polyethylene in a proportion of 3:2 and the mixture is further processed as described above. The properties of the test specimens are indicated in Table VIII.

TABLE VIII

| Example | adhesion promoter | elongation % | tensile strength N/mm² | impact strength mJ/mm² | tensile impact strength mJ/mm² |
|---|---|---|---|---|---|
| comp. | — | 6 | 18 | 4 | 55 |
| 25 | $C_{10-16}H_{21-33}COO(CH_2)_2$—$SO_3Na$ | 10 | 16 | 10 | 65 |
| 26 | $C_{13}H_{27}CH=CH$—$CH_2$—$SO_3Na$ | 9 | 17 | 17 | 70 |
| 27 | $C_{12}H_{25}$—$O(CH_2$—$CH_2$—$O)$—$SO_3Na$[1] | 8 | 17 | 7 | 65 |
| 28 | sec. Na-n-alkane-sulfonate[2] | 9 | 17 | 34 | 75 |

[1] sprayed on in the form of a 25% aqueous solution
[2] chain distribution 3% $C_{13}$, 25% $C_{14}$, 30% $C_{15}$, 25% $C_{16}$, 15% $C_{17}$, 2% $C_{18}$.

EXAMPLE 29

950 parts of polyethylene (density 0.96 g/cc, melt index 23 g/10 min; stabilized as described in Example 1) and 6.3 parts of secondary sodium n-alkane-sulfonate with a chain distribution as indicated in Example 28 are mixed in a rapid mixer at 1,200 rpm for 20 minutes at room temperature.

900 parts of the polyethylene treated in this manner are thoroughly mixed in a plowshare mixer with 600 parts of calcium carbonate (average particle diameter 2.5 μm specific surface 2 m²/g).

The mixture is further processed as described in Example 1. The properties of the test specimens are indicated in Table IX. For comparison a molding composition containing calcium carbonate but no adhesion promoter is used.

EXAMPLE 30

1,050 parts of polyethylene (density 0.96 g/cc, melt index 23 g/10 min, stabilized as described in Example 1), 450 parts of calcium carbonate (average particle diameter 2.5 μm, specific surface 2 m²/g) and 6.75 parts of secondary sodium n-alkane-sulfonate (chain distribution as specified in Example 28) are mixed in a rapid mixer for 4 minutes at room temperature. The composition is extruded and the specimens are prepared and tested as described in Example 1.

The properties of the test specimens are indicated in Table IX. For comparison a molding composition with calcium carbonate but without adhesion promoter is used.

TABLE IX

| Example | elongation % | tensile strength N/mm² | impact strength mJ/mm² | tensile impact strength mJ/mm² |
|---|---|---|---|---|
| comp. | 14 | 21 | 13 | 70 |
| 29 | 16 | 21 | 45 | 75 |
| comp. | 20 | 23 | 40 | 80 |
| 30 | 32 | 22 | without break | 100 |

EXAMPLE 31

600 parts of calcium carbonate (average particle diameter 2.5 μm, specific surface 2 m²/g) are mixed in a rapid mixer at 1,200 rpm for 20 minutes at room temperature with 9 parts of secondary sodium n-alkane-sulfonate (chain distribution cf. Example 28).

The calcium carbonate treated in this manner is thoroughly mixed in a plowshare mixer with 900 parts of polypropylene (density 0.905 g/cc, melt index 7 g/10 min, containing 0.5% by weight of a phenolic stabilizer and 1.75% by weight of a sulfur-containing co-stabilizer).

For comparison 600 parts of untreated calcium carbonate are mixed under the same conditions with 900 parts of polypropylene.

The mixtures are further processed, the test specimens are produced and tested as described in Example 1.

The properties of the test specimens are indicated in Table X.

EXAMPLE 32

900 parts of calcium carbonate as specified in Example 31 and 13.5 parts of secondary sodium n-alkane-sulfonate (chain distribution as specified in Example 28) are mixed in a rapid mixer at 1,200 rpm for 20 minutes at room temperature.

The calcium carbonate treated in this manner is thoroughly mixed in a plowshare mixer with 600 parts of polypropylene as used in Example 31.

For comparison untreated calcium carbonate is mixed with polypropylene in a proportion of 3:2.

The mixture is further processed, the test specimens are prepared and tested as described in Example 1. The properties of the test specimens are indicated in Table X.

TABLE X

| Example | elongation % | tensile strength N/mm² | impact strength mJ/mm² | tensile impact strength mJ/mm² |
|---|---|---|---|---|
| comp. | 23 | 68 | 42 | 180 |
| 31 | 22 | 90 | 86 | 210 |
| comp. | 18 | 54 | 13 | 120 |

TABLE X-continued

| Example | elongation % | tensile strength N/mm² | impact strength mJ/mm² | tensile impact strength mJ/mm² |
|---|---|---|---|---|
| 32 | 16 | 84 | 70 | 150 |

EXAMPLE 33

600 parts of calcium carbonate having an average particle diameter of 2.5 μm and a specific surface (according to BET) of 2 m²/g and 9 parts of secondary sodium n-alkane-sulfonate (chain distribution cf. Example 28) are mixed in a rapid mixer for 20 minutes at room temperature.

The calcium carbonate treated in this manner and 1,400 parts of polyethylene (density 0.96 g/cc, melt index 23 g/10 min, containing 0.42% by weight of a phenolic stabilizer and 2.5% by weight of a sulfur-containing co-stabilizer are thoroughly mixed in a plowshare mixer. The mixture obtained is melted in a double-screw extruder of the type ZSK of Messrs. Werner and Pfleiderer, the melt is ejected through a die, withdrawn in the form of a strand and the strand is granulated with a cutting machine.

For comparison 600 parts of untreated calcium carbonate are mixed in the same manner with 1,400 parts of polyethylene. The mixture is further processed as described above and extruded under the specified extrusion conditions.

In Table XI the output with the same power input into the extruder is indicated.

EXAMPLE 34

800 parts of calcium carbonate having an average particle diameter of 2.5 μm and a specific surface (according to BET) of 2 m²/g and 12 parts of secondary sodium n-alkane-sulfonate (chain distribution cf. Example 28) are mixed in a rapid mixer at room temperature for 20 minutes.

The calcium carbonate treated in this manner and 1,200 parts of polypropylene (density 0.905 g/cc, melt index 7 g/10 minutes containing 0.5% by weight of a phenolic stabilizer and 1.75% by weight of a sulfur-containing co-stabilizer) are thoroughly mixed in a plowshare mixer.

For comparison 800 parts of untreated calcium carbonate and 1,200 parts of polypropylene are mixed in the same manner.

The mixtures are further processed as described in Example 33. The throughput with indentical power input into the extruder is given in Table XI.

EXAMPLE 35

1,200 parts of calcium carbonate as used in Example 34 and 16 parts of secondary sodium n-alkane-sulfonate (chain distribution cf. Example 28) are mixed in a rapid mixer for 20 minutes at room temperature. The calcium carbonate treated in this manner and 800 parts of polypropylene as specified in Example 34 are thoroughly mixed in a plowshare mixer.

For comparison 1,200 parts of untreated calcium carbonate are mixed in the same manner with 800 parts of polypropylene. The mixtures are further processed as described in Example 33.

In a comparative experiment relative to Example 33, 600 parts of calcium carbonate and 9 parts of octane-phosphonic acid are mixed in a rapid mixer for 20 minutes at 80° C. The calcium carbonate treated in this manner and 1,400 parts of polyethylene are thoroughly mixed in a plowshare mixer. The mixture is further processed as described in Example 33.

In a comparative experiment relative to Example 34, 800 parts of calcium carbonate and 12 parts of octane-phosphonic acid are mixed in a mixer for 20 minutes at 80° C. The calcium carbonate treated in this manner and 1,200 parts of polypropylene are thoroughly mixed in a plowshare mixer. The mixture is further processed as described in Example 33.

In another comparative experiment relative to Example 35, 1,200 parts of calcium carbonate and 16 parts of octane-phosphonic acid are mixed in a rapid mixer for 20 minutes at 80° C. as described in Example 34. The calcium carbonate treated in this manner and 800 parts of polypropylene are thoroughly mixed in a plowshare mixer. The mixture is further processed as described in Example 33.

In Table XI are indicated the output with each time an identical power input into the extruder.

TABLE XI

| Example | adhesion promotor | output kg/h |
|---|---|---|
| 33 | — | 2.05 |
| 33 | octane-phosphonic acid | 3.0 |
| 33 | sec. Na-n-alkane-sulfonate | 3.16 |
| 34 | — | 2.4 |
| 34 | octane-phosphonic acid | 2.8 |
| 34 | sec. Na-n-alkane-sulfonate | 3.0 |
| 35 | — | 1.53 |
| 35 | octane-phosphonic acid | 2.5 |
| 35 | sec. Na-n-alkane-sulfonate | 3.0 |

EXAMPLE 36

Through an atomizer 8 parts of a solution of secondary n-alkane-sulfonic acid (chain distribution 3% $C_{13}$, 25% $C_{14}$, 30% $C_{15}$, 25% $C_{16}$, 15% $C_{17}$, 2% $C_{18}$) in 2 parts of water are sprayed within 10 minutes onto 500 parts of calcium carbonate having an average particle diameter of 2.5 μm and a specific surface (according to BET) of 2 m²/g in a rapid mixer.

450 parts of the calcium carbonate treated in this manner and 1,050 parts of polyethylene (density 0.96 g/cc, melt index 23 g/10 min, containing 0.42% by weight of a phenolic stabilizer and 2.5% by weight of a sulfur-containing co-stabilizer) are thoroughly mixed in a plowshare mixer.

The mixture is further processed as described in Example 1. For comparison 450 parts of untreated calcium carbonate are mixed with 1,050 parts of polyethylene in the same manner and the mixture is further processed.

The properties of the test specimens are indicated in Table XII. ½ Standard rod is used as test specimen.

TABLE XII

| Example | elongation | tensile strength N/mm² | impact strength mJ/mm² | tensile impact strength mJ/mm² |
|---|---|---|---|---|
| comp. | 20 | 23 | 40 | 80 |
| 36 | 26 | 21 | without break | 100 |

EXAMPLE 37

Through an atomizer 8 parts of a solution of secondary n-alkane-sulfonic acid (chain distribution 3% $C_{13}$, 25% $C_{14}$, 30% $C_{15}$, 25% $C_{16}$, 15% $C_{17}$, 2% $C_{18}$) in 2 parts of water are sprayed within 10 minutes in a rapid mixer at 1,100 rpm onto 500 parts of calcium carbonate having an average particle diameter of 2.5 μm and a specific surface (according to BET) of 2 m²/g.

450 parts of the calcium carbonate treated in this manner and 1,050 parts of polypropylene (density 0.905 g/cc, melt index 7 g/10 min, containing 0.5% by weight of a phenolic stabilizer and 1.75% by weight of a sulfur-containing co-stabilizer) are thoroughly mixed in a plowshare mixer.

The mixture is further processed as described in Example 1. For comparison 450 parts of untreated calcium carbonate are mixed with 1,050 parts of polypropylene in the same manner and the mixture is further processed.

The properties of the test specimens are indicated in Table XIII. ½ standard rod is used as test specimen.

TABLE XIII

| Example | elongation % | tensile strength N/mm² | impact strength mJ/mm² | tensile impact strength mJ/mm² |
| --- | --- | --- | --- | --- |
| comp. | 130 | 29 | 45 | 200 |
| 37 | 130 | 32 | 95 | 260 |

What is claimed is:

1. A filler-containing molding composition consisting of
    90 to 20 parts by weight of a polyolefin,
    10 to 80 parts by weight of an alkaline earth metal carbonate as fillers, the usual additives and
    0.1 to 10% by weight, calculated on the filler, of an adhesion promotor,
    wherein the adhesion promotor is an organic sulfur compound of the formula $R-SO_3-Me$ in which R denotes a linear or branched alkyl or alkenyl radical having from 6 to 22 carbon atoms which may be substituted by a hydroxy or acetoxy group, the radical $R^1-O(CH_2CH_2O)_m$ in which $R^1$ is alkyl having from 6 to 22 carbon atoms and m is an integer from 1 to 4, the radical $R^1-CO-O(CH_2)_n$ in which $R^1$ is as defined above and n is an integer from 2 to 4, or the radical $R^1-CO-NH(CH_2)_n$ in which $R^1$ and n are as defined above and Me is hydrogen or an alkali metal.

2. A filler-containing molding composition comprising 90 to 20 parts by weight of a polyolefin, 10 to 80 parts by weight of an alkaline earth metal carbonate as filler, and 0.1 to 10% by weight, calculated on the filler, of an adhesion promoter, wherein the adhesion promoter is an organic sulfur compound of the formula $R-SO_3-Me$ in which R denotes a linear or branched alkyl or alkenyl radical having from 6 to 22 carbon atoms which may be substituted by a hydroxy or acetoxy group, the radical $R^1-O(CH_2CH_2O)_m$ in which $R^1$ is alkyl having from 6 to 22 carbon atoms and m is an integer from 1 to 4, the radical $R^1-CO-O(CH_2)_n$ in which $R^1$ is as defined above and n is an integer from 2 to 4, or the radical $R^1-CO-NH(CH_2)_n$ in which $R^1$ and n are as defined above and Me is hydrogen or an alkali metal.

3. The molding composition of claim 2 wherein said polyolefin, filler and adhesion promotor are in admixture with a suitable conventional additive for improving the processibility and mechanical properties thereof.

4. A process for the preparation of a filler-containing molding composition which comprises mixing 90 to 20 parts by weight of a polyolefin, 10 to 80 parts by weight of an alkaline earth metal carbonate and, as an adhesion promotor, 0.1 to 10% by weight, calculated on the filler, of an organic sulfur compound of the formula $R-SO_3-Me$ wherein R denotes a linear or branched alkyl or alkenyl radical having from 6 to 22 carbon atoms which may be substituted by a hydroxy or acetoxy group, the radical $R^1-O(CH_2CH_2O)_m$ in which $R^1$ is alkyl having from 6 to 22 carbon atoms and m is an integer from 1 to 4, the radical $R^1-CO-O(CH_2)_n$ in which $R^1$ is as defined above and n is an integer from 2 to 4, or the radical $R^1-CO-NH(CH_2)_n$ in which $R^1$ and n are as defined above and Me is hydrogen or an alkali metal.

5. The process of claim 4 which further comprises adding a suitable conventional additive for improving the processibility and mechanical properties of said composition.

6. The process of claim 4 wherein said filler is treated with said adhesion promotor before mixing with said polyolefin.

* * * * *